United States Patent
Lee et al.

(10) Patent No.: US 11,306,873 B2
(45) Date of Patent: Apr. 19, 2022

(54) UNIVERSAL HYDROGEN FILLING PERFORMANCE EVALUATION SYSTEM FOR BACK-TO-BACK FILLING PERFORMANCE EVALUATION AND CAPACITY-SPECIFIC FILLING PERFORMANCE EVALUATION

(71) Applicants: Hyundai Motor Company, Seoul (KR); Kia Motors Corporation, Seoul (KR)

(72) Inventors: Dae Nyung Lee, Gyeonggi-do (KR); Aeun Yoon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 42 days.

(21) Appl. No.: 16/815,931

(22) Filed: Mar. 11, 2020

(65) Prior Publication Data
US 2021/0116073 A1    Apr. 22, 2021

(30) Foreign Application Priority Data
Oct. 17, 2019   (KR) .................. 10-2019-0129260

(51) Int. Cl.
*F17C 13/02*   (2006.01)
*F17C 5/00*   (2006.01)

(52) U.S. Cl.
CPC ............... *F17C 13/02* (2013.01); *F17C 5/00* (2013.01); *F17C 2221/012* (2013.01);
(Continued)

(58) Field of Classification Search
CPC .... F17C 13/02; F17C 5/00; F17C 2250/0636; F17C 2250/03; F17C 2250/0408;
(Continued)

(56) References Cited

U.S. PATENT DOCUMENTS

| | | | | |
|---|---|---|---|---|
| 2,341,044 A | * | 2/1944 | Jackson | F17C 1/08 |
| | | | | 220/584 |
| 5,768,507 A | * | 6/1998 | Eglit | G06T 9/004 |
| | | | | 345/520 |
| 5,787,920 A | * | 8/1998 | Krasnov | B60K 15/03006 |
| | | | | 137/255 |

(Continued)

*Primary Examiner* — Timothy L Maust
*Assistant Examiner* — James R Hakomaki
(74) *Attorney, Agent, or Firm* — Mintz Levin Cohn Ferris Glovsky and Popeo, P.C.; Peter F. Corless (57) ABSTRACT

A system for evaluating filling performance of hydrogen storages having various capacities uses a plurality of nozzles, a plurality of receptacles, and a plurality of hydrogen storages, and includes discharging hydrogen filled in one hydrogen storage while filling another hydrogen storage with hydrogen. Evaluation of filling performance may be performed in a back-to-back manner such that hydrogen is introduced into one of the plurality of hydrogen storages and discharged from another of the hydrogen storages. The plurality of hydrogen storages have various capacities, and introduction of hydrogen into the plurality of hydrogen storages is controlled according to a combination of hydrogen storages that corresponds to an evaluation target capacity, such that filling performance evaluation for various capacities is possible.

10 Claims, 5 Drawing Sheets

(52) U.S. Cl.
CPC .. *F17C 2250/03* (2013.01); *F17C 2250/0408* (2013.01); *F17C 2250/0636* (2013.01)

(58) Field of Classification Search
CPC ...... F17C 2221/012; F17C 5/06; F17C 13/04; F17C 2205/0323; F17C 2227/041; F17C 2270/0139
USPC .......................................................... 141/94
See application file for complete search history.

(56) References Cited

U.S. PATENT DOCUMENTS

| | | | |
|---|---|---|---|
| 5,944,215 A * | 8/1999 | Orlowski | F17C 1/16 220/501 |
| 6,810,925 B2 * | 11/2004 | Graham | F17C 13/12 141/98 |
| 7,624,753 B2 * | 12/2009 | Suess | B60K 15/03006 137/266 |
| 8,534,327 B2 * | 9/2013 | Inagi | F17C 5/06 141/4 |
| 8,714,183 B2 * | 5/2014 | Mori | F17C 5/007 137/256 |
| 9,933,114 B2 * | 4/2018 | Thiessen | F17C 5/06 |
| 10,065,751 B2 * | 9/2018 | Kawahara | B64G 1/402 |
| 2006/0118175 A1 * | 6/2006 | Mathison | B60K 15/00 137/256 |
| 2013/0112313 A1 * | 5/2013 | Donnelly | B60S 5/02 141/4 |
| 2015/0107681 A1 * | 4/2015 | Killeen | B60K 15/03006 137/12 |
| 2016/0146401 A1 * | 5/2016 | Leachman | F17C 5/06 141/4 |
| 2020/0156923 A1 * | 5/2020 | Li | B67D 7/82 |
| 2020/0158288 A1 * | 5/2020 | Li | F17C 5/007 |

\* cited by examiner

| CAPACITY OF VEHICLE FILLING TANK | | 1kg HYDROGEN STORAGE | 5kg HYDROGEN STORAGE | 10kg HYDROGEN STORAGE |
|---|---|---|---|---|
| 2kg | | TWO | | |
| 7kg | | TWO | ONE | |
| 10kg | A | | | ONE |
| | B | FIVE | ONE | |
| 23kg | | THREE | | TWO |
| 40kg | | FIVE | ONE | THREE |

UNIVERSAL HYDROGEN FILLING PERFORMANCE EVALUATION SYSTEM FOR BACK-TO-BACK FILLING PERFORMANCE EVALUATION AND CAPACITY-SPECIFIC FILLING PERFORMANCE EVALUATION

CROSS REFERENCE TO RELATED APPLICATION

The present application claims under 35 U.S.C. § 119(a) the benefit of Korean Patent Application No. 10-2019-0129260, filed Oct. 17, 2019, the entire contents of which are incorporated by reference herein.

BACKGROUND

1. Technical Field

The present disclosure relates to a system for evaluating filling performance according to a filling protocol for filling a hydrogen storage with hydrogen in an environment in which hydrogen is used as a fuel, more particularly, to the system capable of evaluating the filling performance in which filling is performed in a back-to-back manner and evaluating the filling performance of storages have various capacities.

2. Description of the Related Art

In a system which evaluates filling performance according to a hydrogen filling protocol, only one kind of filling protocol may be evaluated, and a capacity of a storage according to the filling protocol typically is specified in advance and used. Therefore, in case that the filling protocol is changed, a filling performance evaluation may not be performed unless the system is changed.

In addition, since hydrogen gas that is already filled needs to be discharged to perform evaluation again after performing the filling performance evaluation, the performance evaluation may not be performed again until the hydrogen is completely discharged. As a result, significant time may be required to completely discharge the hydrogen, and thus back-to-back filling performance evaluation may not be performed.

The contents described as the related art have been provided only to assist in understanding the background of the present disclosure and should not be considered as corresponding to the related art known to those having ordinary skill in the art.

SUMMARY

An object of the present disclosure is to evaluate filling performance in a back-to-back manner in which a dispenser including a plurality of nozzles connected to a plurality of dispensers and a plurality of receptacles coupled to the plurality of nozzles are used to introduce hydrogen into one of a plurality of hydrogen storages to fill the one hydrogen storage with hydrogen to thereby evaluate the filling performance while discharging hydrogen in another hydrogen storage.

Another object of the present disclosure is to enable a filling performance evaluation for various evaluation target capacities by using a plurality of receptacles and a plurality of input valves connected to the receptacles to introduce hydrogen into a plurality of hydrogen storages having various capacities, and by controlling the introduction of hydrogen into the plurality of hydrogen storages according to a combination of the hydrogen storages that corresponds to an evaluation target capacity.

According to an embodiment of the present disclosure, a universal hydrogen filling performance evaluation system includes: a plurality of receptacles connected to a plurality of nozzles included in a dispenser, respectively, and through which hydrogen is introduced into a plurality of hydrogen storages; the plurality of hydrogen storages having various capacities, receiving the hydrogen from the plurality of receptacles, and storing the hydrogen therein; and the performance evaluation system configured to carry out back-to-back filling performance evaluation and capacity-specific filling evaluation.

An introduction control valve may be positioned between the plurality of receptacles and the plurality of hydrogen storages, and a state in which the back-to-back filling performance evaluation is allowed may be created by controlling opening and closing of the introduction control valve to introduce hydrogen into one of the plurality of hydrogen storages to fill one of the plurality of hydrogen storages with the hydrogen, and at the same time, by discharging hydrogen from another of the hydrogen storages.

A manifold may be positioned between the plurality of receptacles and the plurality of hydrogen storages, and hydrogen introduction pipes having different dimensions and through which hydrogen is introduced into the plurality of hydrogen storages may be connected through the manifold.

A filling performance evaluation may be performed by controlling introduction of hydrogen into the plurality of hydrogen storages according to a combination of the hydrogen storages that corresponds to an evaluation target capacity.

The hydrogen introduction pipes may be connected to the hydrogen storages, respectively, and input valves may be connected to the hydrogen introduction pipes, respectively, and provided in the large-sized hydrogen storage, and a filling performance evaluation for various capacities is performed by controlling opening and closing of the input valve according to a combination of the hydrogen storages that corresponds to an evaluation target capacity to introduce hydrogen into each of the plurality of hydrogen storages.

The plurality of hydrogen introduction pipes having different dimensions may be connected through the manifold to unify an evaluation time during which the plurality of hydrogen storages are filled with hydrogen.

The plurality of hydrogen storages may each have at least one of a capacity of 1 kg, a capacity of 5 kg, or a capacity of 10 kg.

The plurality of hydrogen storages may each include a hydrogen discharging pipe, and the hydrogen discharging pipe connected to each of the plurality of hydrogen storages may be connected to the manifold to discharge hydrogen through one hydrogen discharging port according to a control of a discharging valve.

Five hydrogen storages each having a capacity of 1 kg, one hydrogen storage having a capacity of 5 kg, and three hydrogen storages each having a capacity of 10 kg may be provided, and a filling performance evaluation for a capacity in a range from 1 kg to 40 kg may be performed by controlling introduction of hydrogen into the plurality of hydrogen storages according to a combination of the hydrogen storages that corresponds to an evaluation target capacity.

One hydrogen storage having a capacity of 1 kg, one hydrogen storage having a capacity of 5 kg, and one hydrogen storage having a capacity of 10 kg may be provided, and a filling performance evaluation for various capacities may be performed by controlling the number of times of introducing and filling of hydrogen into the plurality of hydrogen storages according to a combination of the hydrogen storages that corresponds to an evaluation target capacity.

The plurality of hydrogen storages each having a capacity of 1 kg, 5 kg, or 10 kg may be hydrogen storages formed by partitioning one large-sized hydrogen storage by using a partition, a plurality of hydrogen introduction pipes connected to the hydrogen storages, respectively, and input valves connected to the hydrogen introduction pipes, respectively, may be provided in the large-sized hydrogen storage, and a filling performance evaluation for various capacities may be performed by controlling opening and closing of the input valve according to a combination of the hydrogen storages that corresponds to an evaluation target capacity to introduce hydrogen into each of the plurality of hydrogen storages.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "—er", "—of", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, embodiments of the present disclosure will be described in detail with reference to the accompanying drawings so that those skilled in the art to which the present disclosure pertains may easily practice the present disclosure. However, the present disclosure may be modified in various different forms, and is not limited to embodiments described herein.

Hereinafter, a universal hydrogen filling performance evaluation system for back-to-back filling performance evaluation and capacity-specific filling performance evaluation according to an embodiment of the present disclosure will be described with reference to the drawings.

Figure 1:
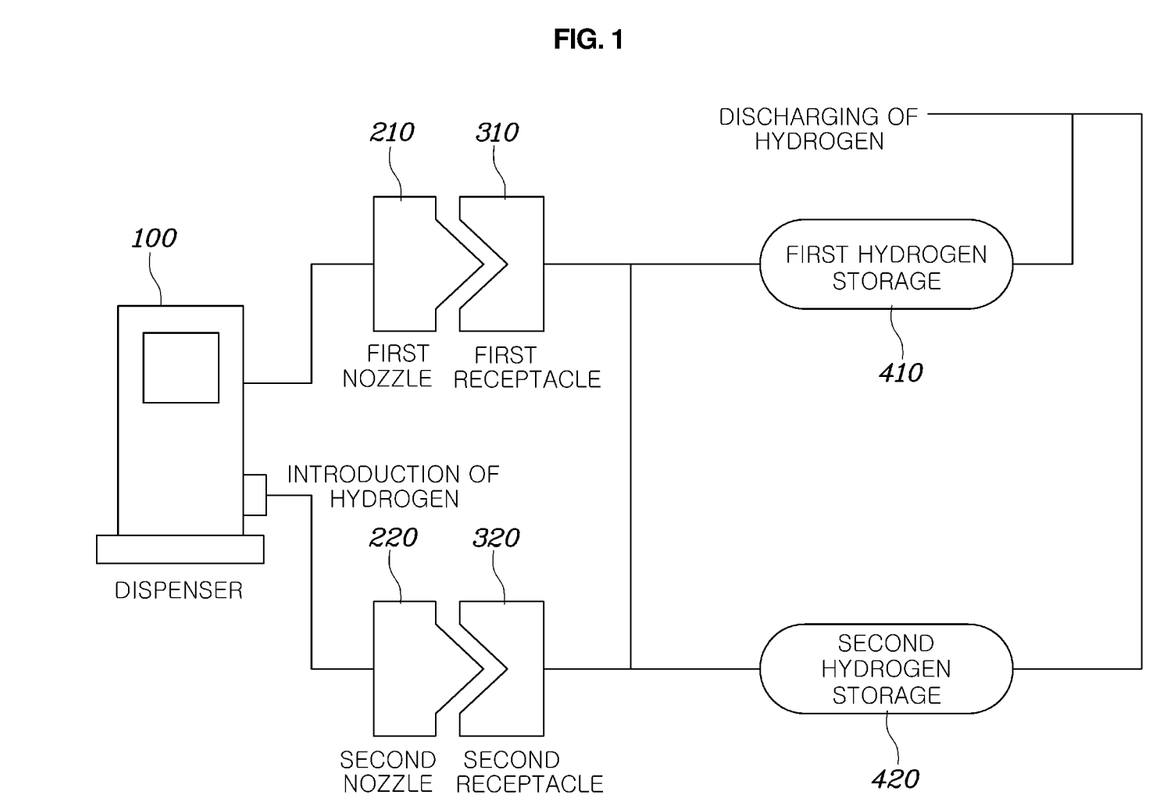
FIG. 1 is a configuration diagram of a universal hydrogen filling performance evaluation system for back-to-back filling performance evaluation and capacity-specific filling performance evaluation according to a first embodiment of the present disclosure.

FIG. 1 is a configuration diagram of a universal hydrogen filling performance evaluation system for back-to-back filling performance evaluation and capacity-specific filling performance evaluation according to a first embodiment of the present disclosure.

According to an embodiment of the present disclosure, the universal hydrogen filling performance evaluation system for back-to-back filling performance evaluation and capacity-specific filling performance evaluation may include a plurality of receptacles 300 and a plurality of hydrogen storages 400. According to the first embodiment of the present disclosure illustrated in FIG. 1, the universal hydrogen filling performance evaluation system for back-to-back filling performance evaluation and capacity-specific filling performance evaluation may include first and second nozzles 210 and 220, first and second receptacles 310 and 320, and first and second hydrogen storages 410 and 420.

A dispenser 100 may include a plurality of nozzles 200 each provided for each capacity, and hydrogen may be introduced through the plurality of nozzles 200 in a hydrogen storage input direction.

According to the first embodiment of the present disclosure, one or a plurality of dispensers may be provided, and in case that a plurality of dispensers are provided, the plurality of provided dispensers may include a passenger dispenser and a commercial dispenser.

According to an embodiment of the present disclosure, the dispenser 100 may include one nozzle, or two (first and second nozzles) or more nozzles.

The plurality of receptacles 300 are connected to the plurality of nozzles included in the dispenser, respectively, and hydrogen introduced through the nozzle may be introduced into the plurality of hydrogen storages through the plurality of receptacles 300.

According to an embodiment of the present disclosure, the number of receptacles may be two (first and second receptacles) or more, the receptacle and the nozzle may be connected to each other in a one-to-one relationship, and the connected receptacle may receive hydrogen gas from the nozzle and the hydrogen gas may be introduced into at least one hydrogen storage through the connected receptacle.

The plurality of hydrogen storages 400 may be storages having various capacities that may receive hydrogen from the plurality of receptacles and store the hydrogen.

According to an embodiment of the present disclosure, the hydrogen storage may be any hydrogen storage without limitation in a material, a size, a capacity, and a detailed specification, as long as the hydrogen storage is a hydrogen storage device provided to replicate a hydrogen filling tank located inside or outside equipment that is used for a vehicle or other use.

According to an embodiment of the present disclosure, a process in which hydrogen discharged from the dispenser 100 passes through the nozzle 200 and the receptacle 300 and is introduced into the hydrogen storage 400 to fill the hydrogen storage 400 with the hydrogen may be referred to as a filling protocol.

According to the first embodiment of the present disclosure, the first and second nozzles 210 and 220 included in the dispenser 100 may be connected to the first and second receptacles 310 and 320, respectively, and hydrogen introduced from the dispenser 100 may pass through the first and second nozzles 210 and 220, and the first and second receptacles 310 and 320 and be introduced into one of the first and second hydrogen storages 410 and 420 to fill one of the first and second hydrogen storages with the hydrogen.

According to the embodiment, in case that hydrogen introduced from the dispenser 100 passes through the first and second receptacles 310 and 320 and is introduced into one of the first and second hydrogen storages 410 and 420 to fill one of the first and second hydrogen storages with the hydrogen, a state in which the back-to-back filling performance evaluation is possible may be created by discharging hydrogen filled in the hydrogen storage that is not being filled simultaneously with the filling.

Figure 2:
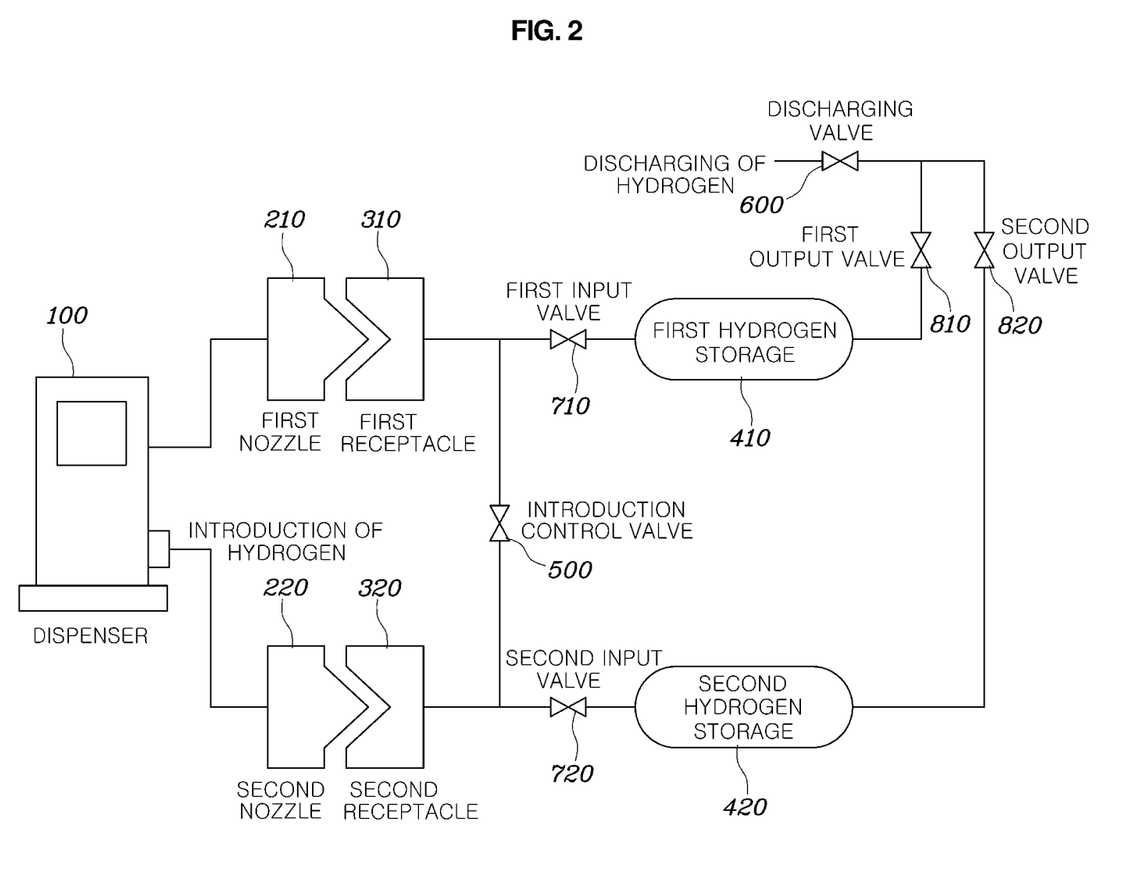
FIG. 2 is a configuration diagram of a universal hydrogen filling performance evaluation system for back-to-back filling performance evaluation and capacity-specific filling performance evaluation according to a second embodiment of the present disclosure.

FIG. 2 is a configuration diagram of a universal hydrogen filling performance evaluation system for back-to-back filling performance evaluation and capacity-specific filling performance evaluation according to a second embodiment of the present disclosure.

Referring to FIG. 2, in the universal hydrogen filling performance evaluation system for back-to-back filling performance evaluation and capacity-specific filling performance evaluation according to the second embodiment of the present disclosure, a plurality of receptacles, a plurality of hydrogen storages, and an introduction control valve 500 positioned between the plurality of receptacles and the plurality of hydrogen storages may be provided.

According to the second embodiment of the present disclosure, a state in which back-to-back filling performance evaluation is possible may be created by controlling opening and closing of the introduction control valve 500 to introduce hydrogen into one of the plurality of hydrogen storages to thereby fill one of the plurality of hydrogen storages with the hydrogen, and at the same time, by discharging hydrogen from another hydrogen storage.

According to the embodiment, the introduction control valve 500 may be closed or open to control a flow of hydrogen gas introduced from a first receptacle 310 or a second receptacle 320. According to the second embodiment, in case that hydrogen is introduced into a first hydrogen storage 410 to fill the first hydrogen storage 410 with the hydrogen according to a control of the introduction control valve 500, a second hydrogen storage 420 may discharge hydrogen filled therein, and in case that hydrogen is introduced into the second hydrogen storage 420 to fill the second hydrogen storage 420 with the hydrogen, the first hydrogen storage 410 may discharge hydrogen filled therein.

According to the second embodiment of the present disclosure, the first hydrogen storage 410 may be connected to a first output valve 810, the second hydrogen storage 420 may be connected to a second output valve 820, and discharging of hydrogen from the first hydrogen storage 410 or the second hydrogen storage 420 may be controlled by controlling the first output valve 810 or the second output valve 820.

Further, discharging of hydrogen in the entire system may be controlled by using a discharging valve 600.

According to an embodiment of the present disclosure, the first hydrogen storage may be filled by controlling an amount of hydrogen introduced from the introduction control valve 500 through a first input valve 710, and the second hydrogen storage may be filled by controlling an amount of hydrogen introduced from the introduction control valve 500 through a second input valve 720.

Figure 3:
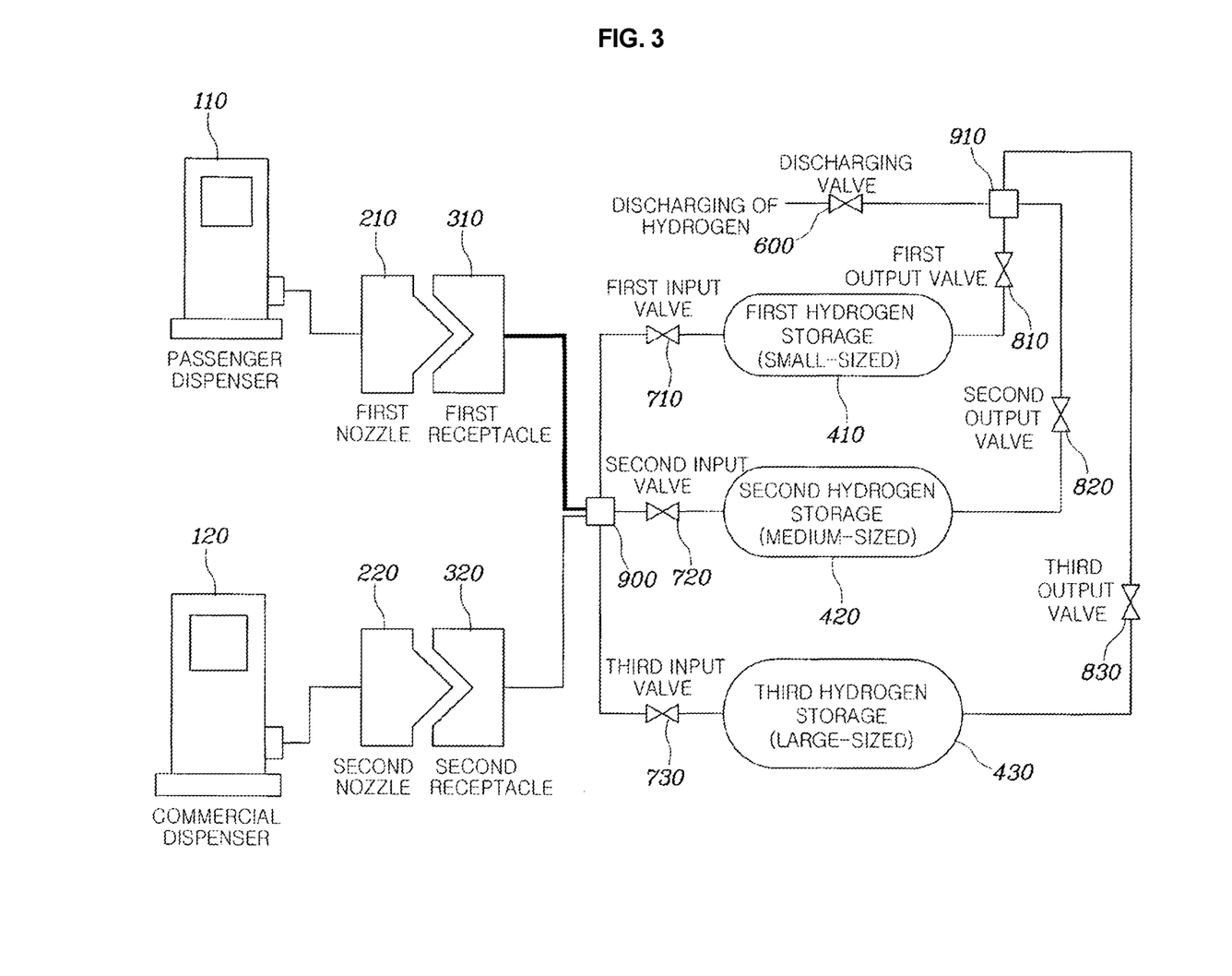
FIG. 3 is a configuration diagram of a universal hydrogen filling performance evaluation system for back-to-back filling performance evaluation and capacity-specific filling performance evaluation according to a third embodiment of the present disclosure.

FIG. 3 is a configuration diagram of a universal hydrogen filling performance evaluation system for back-to-back filling performance evaluation and capacity-specific filling performance evaluation according to a third embodiment of the present disclosure.

Referring to FIG. 3, the universal hydrogen filling performance evaluation system for back-to-back filling performance evaluation and capacity-specific filling performance evaluation according to the third embodiment of the present disclosure may include a passenger dispenser 110, a commercial dispenser 120, a first nozzle 210, a second nozzle 220, a first receptacle 310, a second receptacle 320, first to third hydrogen storages 410 to 430, first to third input valves 710 to 730, first to third output valves 810 to 830, manifolds 900 and 910, and a discharging valve 600.

According to an embodiment of the present disclosure, the manifold 900 is positioned between a plurality of receptacles 310 and 320, and a plurality of hydrogen storages 410 to 430, and hydrogen introduction pipes having different dimensions and through which hydrogen is introduced into the plurality of hydrogen storages may be connected through the manifold 900.

According to an embodiment of the present disclosure, the plurality of hydrogen storages may each have a capacity of 1 kg, 5 kg, or 10 kg, and a hydrogen storage having a capacity of 1 kg may be classified as a small-sized storage, a hydrogen storage having a capacity of 5 kg may be classified as a medium-sized storage, and a hydrogen storage having a capacity of 10 kg may be classified as a large-sized storage.

According to an embodiment of the present disclosure, the plurality of hydrogen storages 410 to 430 may each include a hydrogen discharging pipe and may include the first to third output valves 810 to 830 connected thereto, respectively, the hydrogen discharging pipe connected to each of the plurality of hydrogen storages may be connected to the manifold 910 to discharge hydrogen through one hydrogen discharging port according to a control of the discharging valve.

According to an embodiment of the present disclosure, the universal hydrogen filling performance evaluation system may include five hydrogen storages each having a capacity of 1 kg, one hydrogen storage having a capacity of 5 kg, and three hydrogen storages each having a capacity of 10 kg, and a filling performance evaluation for a capacity in a range from 1 kg to 40 kg may be performed by controlling introduction of hydrogen into a plurality of hydrogen storages according to a combination of the hydrogen storages that corresponds to an evaluation target capacity.

According to another embodiment of the present disclosure, the universal hydrogen filling performance evaluation system may include one hydrogen storage having a capacity of 1 kg, one hydrogen storage having a capacity of 5 kg, and one hydrogen storage having a capacity of 10 kg, and a filling performance evaluation for various capacities may be performed by controlling the number of times of inputting and filling of hydrogen into the plurality of hydrogen storages according to a combination of the hydrogen storages that corresponds to an evaluation target capacity.

Figure 4:
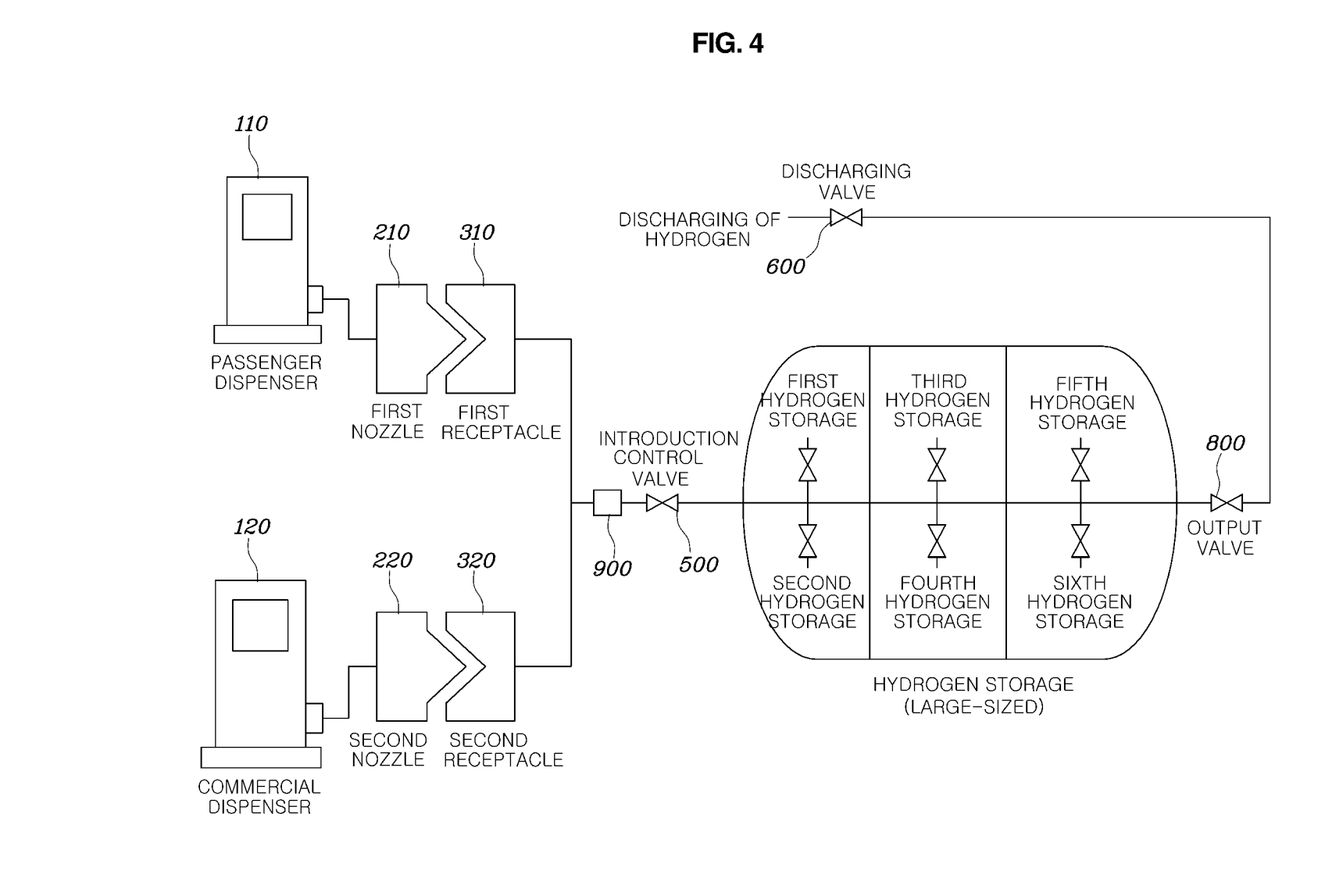
FIG. 4 is a configuration diagram of a universal hydrogen filling performance evaluation system for back-to-back filling performance evaluation and capacity-specific filling performance evaluation according to a fourth embodiment of the present disclosure.

FIG. 4 is a configuration diagram of a universal hydrogen filling performance evaluation system for back-to-back filling performance evaluation and capacity-specific filling performance evaluation according to a fourth embodiment of the present disclosure.

Referring to FIG. 4, the universal hydrogen filling performance evaluation system for back-to-back filling performance evaluation and capacity-specific filling performance evaluation according to the fourth embodiment of the present disclosure may include a passenger dispenser 110, a commercial dispenser 120, a first nozzle 210, a second nozzle 220, a first receptacle 310, a second receptacle 320, first to sixth hydrogen storages formed in a large-sized hydrogen storage by partitioning the large-sized hydrogen storage using a partition, an introduction control valve 500, an output valve 800, a manifold 900, and a discharging valve 600.

According to the fourth embodiment of the present disclosure, the plurality of hydrogen storages each having a capacity of 1 kg, 5 kg, or 10 kg may be hydrogen storages formed by partitioning one large-sized hydrogen storage using a partition, and a capacity of a large-sized hydrogen storage may be divided by forming hydrogen storages having a plurality of various capacities such as 1 kg, 5 kg, and 10 kg by using a partition and a filling performance evaluation for an evaluation target capacity may be performed according to a combination of the capacities.

According to the embodiment, a plurality of hydrogen introduction pipes connected to the hydrogen storages, respectively, and input valves connected to the hydrogen introduction pipes, respectively, may be provided in the large-sized hydrogen storage, and a filling performance evaluation for various capacities may be performed by controlling opening and closing of the input valve connected to each hydrogen introduction pipe according to a combination of the hydrogen storages that corresponds to an evaluation target capacity to introduce hydrogen into each of the plurality of hydrogen storages.

According to the embodiment, pipes having different dimensions and connected to the first and second receptacles, respectively, may be connected integrally by using the manifold 900, and opening and closing of the introduction control valve 500 may be controlled to control introduction of hydrogen from the integrated pipes.

According to an embodiment of the present disclosure, a plurality of hydrogen introduction pipes having different dimensions are connected through the manifold 900, such that an evaluation time during which the plurality of hydrogen storages are filled with hydrogen may be unified.

Figure 5:
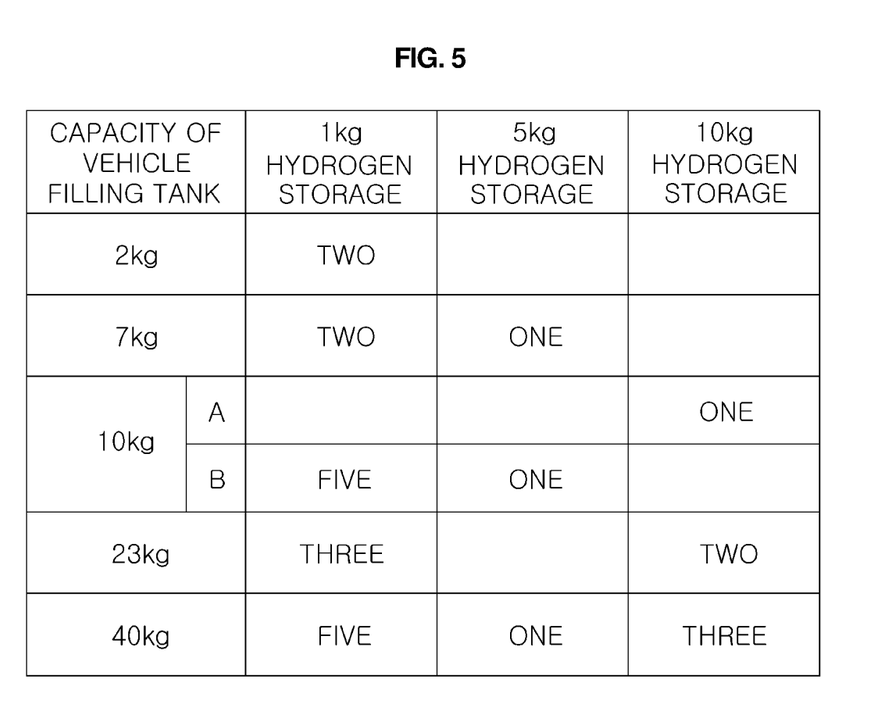
FIG. 5 is a table showing information on a possible combination of hydrogen storages in case that an evaluation target capacity is 1 to 40 kg according to an embodiment of the present disclosure.

FIG. 5 is a table showing information on a possible combination of hydrogen storages in case that an evaluation target capacity is 1 to 40 kg according to an embodiment of the present disclosure.

FIG. 5 shows a combination of hydrogen storages that may be used for evaluation in case that a plurality of hydrogen storages each having a capacity of 1 kg, 5 kg, or 10 kg are used and an evaluation target capacity is 1 to 40 kg.

According to another embodiment of the present disclosure, a dimension of a discharging pipe may be different depending on a capacity of a corresponding hydrogen storage, such that hydrogen may be discharged within the same time, similarly to when hydrogen is filled. As a result, hydrogen may be discharged within the same time regardless of the capacity of the hydrogen storage.

According to the present disclosure, hydrogen is introduced into one of the plurality of hydrogen storages to fill the hydrogen storage with hydrogen to thereby evaluate filling performance, and at the same time, another hydrogen storage is controlled to discharge hydrogen to create a state in which the back-to-back filling performance evaluation may be performed, such that it is possible to decrease a time required for the performance evaluation and evaluate the filling performance of the filling protocol back-to-back.

Further, according to the present disclosure, a plurality of hydrogen storages having various capacities are provided, and introduction of hydrogen into the plurality of hydrogen storages is controlled according to a combination of the hydrogen storages that corresponds to the evaluation target capacity to enable the filling performance evaluation for various capacities.

Although embodiments of the present disclosure have been described in detail hereinabove, the scope of the present disclosure is not limited thereto, but may include several modifications and alterations made by those skilled in the art using a basic concept of the present disclosure as defined in the claims.

What is claimed is:

1. A universal hydrogen filling performance evaluation system for carrying out back-to-back filling performance evaluation and capacity-specific filling evaluation, comprising:
   a plurality of receptacles connected to a plurality of nozzles included in a dispenser, respectively, and through which hydrogen is introduced into a plurality of hydrogen storages,
   the plurality of hydrogen storages having various capacities, receiving the hydrogen from the plurality of receptacles, and storing the hydrogen therein,
   wherein an introduction control valve is positioned between the plurality of receptacles and the plurality of hydrogen storages, and the introduction control valve is positioned between the plurality of hydrogen storages such that a state in which the back-to-back filling performance evaluation is allowed is created by controlling opening and closing of the introduction control valve to introduce hydrogen into one of the plurality of hydrogen storages to fill the one of the plurality of hydrogen storages with the hydrogen, and at the same time, by discharging hydrogen from another of the hydrogen storages.

2. The universal hydrogen filling performance evaluation system of claim 1, wherein a manifold is positioned between the plurality of receptacles and the plurality of hydrogen storages, and hydrogen introduction pipes having different dimensions and through which hydrogen is introduced into the plurality of hydrogen storages are connected through the manifold.

3. The universal hydrogen filling performance evaluation system of claim 2, wherein a filling performance evaluation is performed by controlling introduction of hydrogen into the plurality of hydrogen storages according to a combination of the hydrogen storages that corresponds to an evaluation target capacity.

4. The universal hydrogen filling performance evaluation system of claim 2, wherein the hydrogen introduction pipes are connected to the hydrogen storages, respectively, and input valves connected to the hydrogen introduction pipes, respectively, are provided in a large-sized hydrogen storage, and a filling performance evaluation for various capacities is performed by controlling opening and closing of the input valves according to a combination of the hydrogen storages that corresponds to an evaluation target capacity to introduce hydrogen into each of the plurality of hydrogen storages.

5. The universal hydrogen filling performance evaluation system of claim 2, wherein the plurality of hydrogen introduction pipes having different dimensions are connected through the manifold to unify an evaluation time during which the plurality of hydrogen storages are filled with hydrogen.

6. The universal hydrogen filling performance evaluation system of claim 2, wherein the plurality of hydrogen storages each have at least one of a capacity of 1 kg, a capacity of 5 kg, or a capacity of 10 kg.

7. The universal hydrogen filling performance evaluation system of claim 6, wherein the plurality of hydrogen storages each include a hydrogen discharging pipe, and the hydrogen discharging pipe connected to each of the plurality of hydrogen storages is connected to the manifold to discharge hydrogen through one hydrogen discharging port according to a control of a discharging valve.

8. The universal hydrogen filling performance evaluation system of claim 6, wherein five hydrogen storages each having a capacity of 1 kg, one hydrogen storage having a capacity of 5 kg, and three hydrogen storages each having a capacity of 10 kg are provided, and a filling performance evaluation for a capacity in a range from 1 kg to 40 kg is performed by controlling introduction of hydrogen into the plurality of hydrogen storages according to a combination of the hydrogen storages that corresponds to an evaluation target capacity.

9. The universal hydrogen filling performance evaluation system of claim 6, wherein one hydrogen storage having a capacity of 1 kg, one hydrogen storage having a capacity of 5 kg, and one hydrogen storage having a capacity of 10 kg are provided, and a filling performance evaluation for various capacities is performed by controlling the number of times of inputting and filling of hydrogen into the plurality of hydrogen storages according to a combination of the hydrogen storages that corresponds to an evaluation target capacity.

10. The universal hydrogen filling performance evaluation system of claim 6, wherein the plurality of hydrogen storages each having a capacity of 1 kg, 5 kg, or 10 kg are hydrogen storages formed by partitioning one large-sized hydrogen storage by using a partition, the plurality of hydrogen introduction pipes are connected to the hydrogen storages, respectively, and input valves connected to the hydrogen introduction pipes, respectively, are provided in the large-sized hydrogen storage, and a filling performance evaluation for various capacities is performed by controlling opening and closing of the input valve according to a combination of the hydrogen storages that corresponds to an evaluation target capacity to introduce hydrogen into each of the plurality of hydrogen storages.

* * * * *